(12) United States Patent
Ruan et al.

(10) Patent No.: US 10,391,851 B2
(45) Date of Patent: Aug. 27, 2019

(54) TRANSMISSION UNIT, POWER TRANSMISSION SYSTEM AND VEHICLE COMPRISING THE SAME

(71) Applicant: BYD COMPANY LIMITED, Shenzhen, Guangdong (CN)

(72) Inventors: Ou Ruan, Shenzhen (CN); Zhen Zhai, Shenzhen (CN); Youbin Xu, Shenzhen (CN); Fei Wu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 173 days.

(21) Appl. No.: 15/648,819

(22) Filed: Jul. 13, 2017

(65) Prior Publication Data

US 2017/0305257 A1    Oct. 26, 2017

Related U.S. Application Data

(63) Continuation of application No. PCT/CN2015/082957, filed on Jun. 30, 2015.

(30) Foreign Application Priority Data

Jan. 16, 2015 (CN) .......................... 2015 1 0024171

(51) Int. Cl.
  *F16H 3/00* (2006.01)
  *B60K 6/48* (2007.10)
  (Continued)

(52) U.S. Cl.
  CPC .................. *B60K 6/48* (2013.01); *B60K 6/26* (2013.01); *B60K 6/365* (2013.01); *B60K 6/387* (2013.01);
  (Continued)

(58) Field of Classification Search
  CPC ... F16H 3/006; F16H 2003/0931; B60K 6/26; B60K 6/48; Y02T 10/626
  See application file for complete search history.

(56) References Cited

U.S. PATENT DOCUMENTS

| 9,341,239 B2 * | 5/2016 | Lee ........................... F16H 3/08 |
| 2002/0033059 A1 * | 3/2002 | Pels ......................... B60K 6/26 74/329 |

(Continued)

FOREIGN PATENT DOCUMENTS

| CN | 103921674 A | 7/2014 |
| CN | 204055300 U | 12/2014 |

(Continued)

OTHER PUBLICATIONS

International Search Report and Written Opinion for Application No. PCT/CN2015/082957, dated Oct. 22, 2015, 7 pages.

*Primary Examiner* — Edwin A Young

(57) ABSTRACT

A transmission unit includes: gear pairs; input shafts; output shafts performing power transmission with the input shafts via the gear pairs; a motor power output gear disposed on one of the output shafts; a motor power shaft; a first motor power shaft gear disposed on the motor power shaft and configured to rotate together with one shift driving gear; a second motor power shaft gear disposed on the motor power shaft and configure to rotate together with the motor power output gear; and an output idler gear fitted over the motor power shaft and configured to rotate together with the motor power shaft via a synchronizer. A power transmission system including the transmission unit and a vehicle including the power transmission system are also provided.

22 Claims, 10 Drawing Sheets

(51) Int. Cl.
| | |
|---|---|
| *B60K 6/547* | (2007.10) |
| *B60K 6/26* | (2007.10) |
| *B60K 6/365* | (2007.10) |
| *B60K 6/40* | (2007.10) |
| *B60K 6/52* | (2007.10) |
| *F16H 3/091* | (2006.01) |
| *F16H 37/08* | (2006.01) |
| *F16H 48/36* | (2012.01) |
| *B60K 6/387* | (2007.10) |
| *F16H 3/08* | (2006.01) |
| *F16H 3/093* | (2006.01) |

(52) U.S. Cl.
CPC .......... *B60K 6/40* (2013.01); *B60K 6/52* (2013.01); *B60K 6/547* (2013.01); *F16H 3/006* (2013.01); *F16H 3/091* (2013.01); *F16H 37/0806* (2013.01); *F16H 48/36* (2013.01); *B60K 2006/4808* (2013.01); *B60K 2006/4816* (2013.01); *B60K 2006/4841* (2013.01); *B60Y 2200/92* (2013.01); *F16H 2003/0803* (2013.01); *F16H 2003/0822* (2013.01); *F16H 2003/0931* (2013.01); *F16H 2048/364* (2013.01); *Y02T 10/626* (2013.01); *Y02T 10/6221* (2013.01); *Y02T 10/6256* (2013.01); *Y02T 10/6265* (2013.01); *Y10S 903/906* (2013.01); *Y10S 903/91* (2013.01); *Y10S 903/916* (2013.01); *Y10S 903/919* (2013.01); *Y10S 903/951* (2013.01)

(56) References Cited

U.S. PATENT DOCUMENTS

| | | | |
|---|---|---|---|
| 2002/0177504 A1* | 11/2002 | Pels | B60K 6/36 477/3 |
| 2006/0142104 A1* | 6/2006 | Saller | B60K 6/365 475/5 |
| 2014/0144288 A1 | 5/2014 | Glueckler | |

FOREIGN PATENT DOCUMENTS

| | | |
|---|---|---|
| CN | 104276030 A | 1/2015 |
| DE | 10239540 A1 | 3/2004 |
| DE | 102011086743 A1 | 5/2013 |
| EP | 2340954 A2 | 7/2011 |
| EP | 2390127 A1 | 11/2011 |
| JP | H0993714 A | 4/1997 |
| JP | 2009156305 A | 7/2009 |

* cited by examiner

TRANSMISSION UNIT, POWER TRANSMISSION SYSTEM AND VEHICLE COMPRISING THE SAME

CROSS-REFERENCE TO RELATED APPLICATIONS

This application is a continuation application of International Application No. PCT/CN2015/082957, filed on Jun. 30, 2015, which is based on and claims priority to and benefits of Chinese Patent Application No. 201510024171.2, filed with the State Intellectual Property Office (SIPO) of the People's Republic of China on Jan. 16, 2015. The entire contents of the above-identified applications are incorporated herein by reference.

FIELD

Embodiments of the present disclosure relate to vehicles, and more particularly to a transmission unit, a power transmission system including the transmission unit, and a vehicle including the power transmission system.

BACKGROUND

To reduce energy consumption, the development and utilization of energy-efficient vehicles have become a trend. As an energy-efficient vehicle, a hybrid vehicle is driven by at least one of an internal combustion engine and a motor and has various operation modes, and consequently may operate with improved transmission efficiency and fuel efficiency.

However, in the related art, the power transmission system in the hybrid vehicle is generally complex in structure, provides fewer transmission modes, and is low in transmission efficiency. Besides, for most hybrid vehicles, the charging process is always carried out during the running of the vehicle. Therefore, a conventional hybrid vehicle has relatively fewer charging modes and charging passage, and lower charging efficiency.

SUMMARY

Embodiments of the present disclosure seek to solve at least one of the problems existing in the prior art to at least some extent.

Embodiments of a first broad aspect of the present disclosure provide a transmission unit. The transmission unit according to embodiments of the present disclosure includes: a plurality of input shafts, each of the input shafts being provided with a shift driving gear thereon; a plurality of output shafts, each of the output shafts being provided with a shift driven gear configured to mesh with a corresponding shift driving gear; a motor power output gear disposed on one of the output shafts; a motor power shaft; a first motor power shaft gear disposed on the motor power shaft and configured to rotate together with a shift driving gear; a second motor power shaft gear disposed on the motor power shaft and configured to rotate together with the motor power output gear; an output idler gear fitted over the motor power shaft; and an output idler gear synchronizer disposed on the motor power shaft and configured to engage with output idler gear.

Embodiments of a second broad aspect of the present disclosure provide a power transmission system including the transmission unit. The power transmission system including the transmission unit according to embodiments of the present disclosure includes the above-identified transmission unit and a first motor generator configured to rotate together with the motor power shaft.

Embodiments of a third broad aspect of the present disclosure provide a vehicle. The vehicle according to embodiments of the present disclosure includes the above-identified power transmission system for a vehicle.

With the power transmission unit and the power transmission system according to embodiments of the present disclosure, the number of the transmission modes is increased, and various conditions, such as charging the vehicle while parked or charging the vehicle while driving, may be accomplished.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
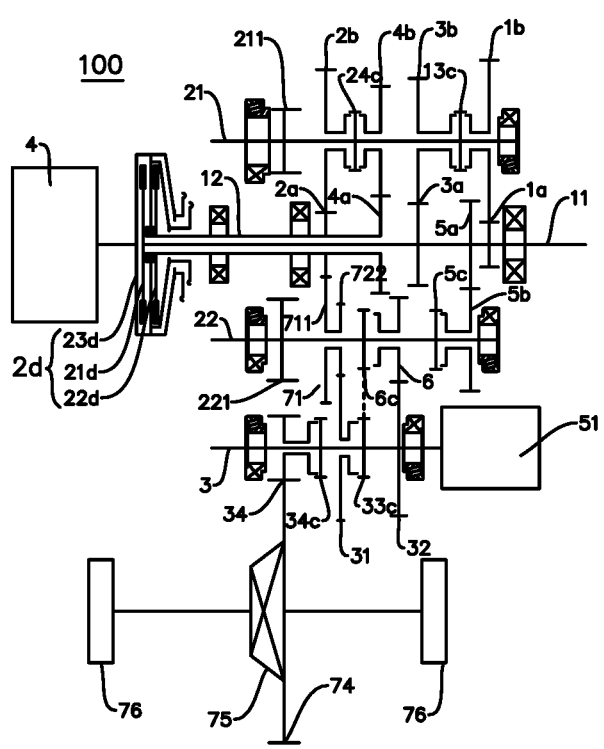
FIG. 1 is a schematic view of an exemplary power transmission system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure.

The same or similar elements and the elements having same or similar functions are denoted by like reference numerals throughout the descriptions.

In the specification, it should be understood that, the terms such as "central", "longitudinal", "lateral", "width", "thickness", "above", "below", "front", "rear", "right", "left", "vertical", "horizontal", "top", "bottom", "inner", "outer", "clockwise", "counter-clockwise" should be construed to refer to the orientation as then described or as shown in the drawings. These terms are merely for convenience and concision of description and do not alone indicate or imply that the device or element referred to must have a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more of these feature. In the description of the present disclosure, "a plurality of" means two or more than two of these features, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature. A first feature "below," "under," or "on bottom of" a second feature may include an embodiment in which the first feature is right or obliquely "below," "under," or "on bottom of" the second feature, or just means that the first feature is at a distance lower than that of the second feature.

A power transmission system according to embodiments of the present disclosure may be described below with reference to FIGS. 1-10. The power transmission system according to embodiments of the present disclosure may be used in vehicles such as hybrid vehicles as a power system, which may provide sufficient power and electric power for driving the vehicle.

Figure 6:
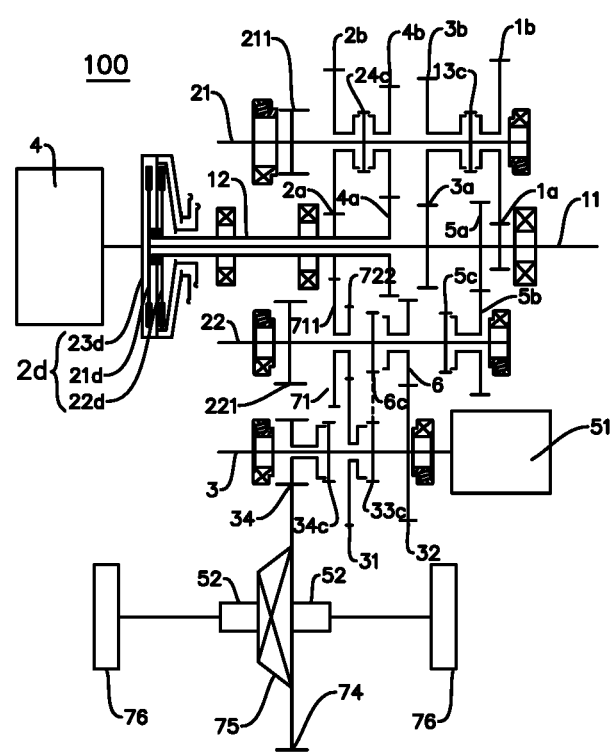
FIG. 6 is a schematic view of an exemplary power transmission system according to another embodiment of the present disclosure.

In some embodiments, a power transmission system 100 may generally include a power unit and a transmission unit. The power unit may be an engine 4, a motor generator, and so on. In some embodiments, the transmission unit 101 as shown in FIG. 6 may transmit power output from the power unit, thus driving or charging the vehicle.

Figure 10:
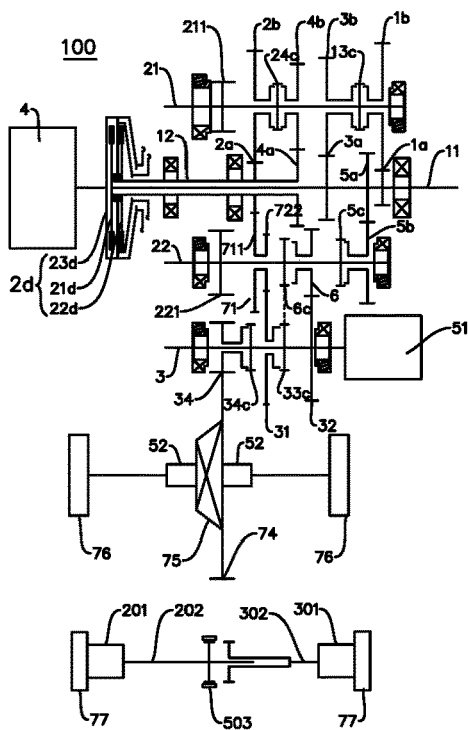
FIG. 10 is a schematic view of an exemplary power transmission system according to another embodiment of the present disclosure.
Figure 11:
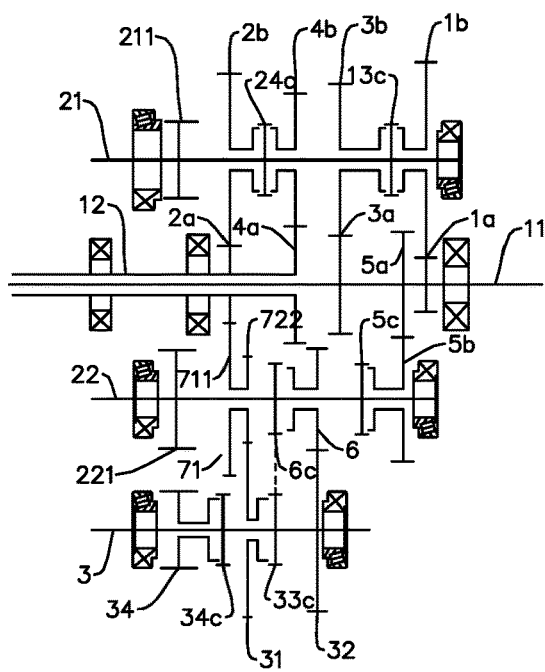
FIG. 11 is a schematic view of an exemplary power transmission unit of a power transmission system according to an embodiment of the present disclosure.

In some embodiments, as shown in FIGS. 1-10, the power transmission system 100 may include, but is not limited to, an engine 4, a first motor generator 51 and a transmission unit 101 as shown in FIG. 11.

In some embodiments as shown in, for example, FIG. 1, the transmission 101 unit includes a plurality of input shafts (e.g. a first input shaft 11, a second input shaft 12), a plurality of output shafts (e.g. a first output shaft 21, a second output shaft 22), a motor power shaft 3, a plurality of gears provided on related shafts (such as the input shaft, the output shaft, and the motor power shaft), and a gear shift member such as a synchronizer.

In some embodiments, the engine 4 is configured to selectively engage with at least one of the input shafts, when the engine 4 performs power transmission with the input shaft(s). For example, when the engine 4 is transmitting power to the input shaft, the engine 4 may selectively engage with one of the input shafts to transmit power. In some embodiments, the engine 4 may be selectively engage with two or more of the input shafts simultaneously to transmit power.

In some embodiments, as shown in FIGS. 1-10, the plurality of input shafts include a first input shaft 11 and a second input shaft 12. The engine 4 may selectively engage with one of the first and second input shafts 11, 12 to transmit power. In some embodiments, the engine 4 may engage with the first and second input shafts 11, 12 simultaneously to transmit power. It should be noted that the engine 4 may be disengaged from the first and second input shafts 11, 12 simultaneously.

It is known to a person skilled in the art that the engagement between the engine 4 and the input shaft(s) is related to specific conditions of the power transmission system 100. The engagement between the engine 4 and the input shaft(s) will be described below in detail with reference to detailed embodiments.

In some embodiments, the power transmission between the input shaft(s) and the output shaft(s) is achieved by shaft gear pairs. For example, each of the input shafts has a shaft driving gear provided thereon, and each of the output shafts has a shaft driven gear provided thereon, so that a plurality of gear pairs with different velocity ratio are formed by meshes of corresponding shaft driving gears and shaft driven gears.

In some embodiments, the transmission unit may be a five-speed transmission, i.e. the transmission unit may include a first-gear gear pair, a second-gear gear pair, a third-gear gear pair, a fourth-gear gear pair and a fifth-gear gear pair. There are no particular limits in the present disclosure, and a person skilled in the art may increase or reduce the number of gear pairs accordingly based on transmission requirements, and the transmission unit may not be limited to the five-speed transmission as disclosed in the present embodiment.

In some embodiments, as shown in FIGS. 1-10, a motor power output gear 6 may be dispose on one of the output shafts. In some embodiments, the motor power output gear 6 may be disposed on the second output shaft 22, which may not be construed as a limitation.

The detailed configuration of the motor power shaft 3 may be described in detail below with reference to detailed embodiments. In some embodiments, a first motor power shaft gear 31, a second motor power shaft gear 32, and an output idler gear 34 are all disposed on the motor power shaft 3.

In some embodiments, as shown in FIG. 1, the first motor power shaft gear 31 may be configured to rotate together with a shift driving gear, such as a second-gear shift driving gear 2a. In other words, power generated by the first motor generator 51 may be transmitted to the corresponding shift driving gear via the first motor power shaft gear 31. Power generated by the engine 4 may be transmitted to the first motor power shaft gear 31 via the shift driving gear, such as the second-gear shift driving gear 2a.

In some embodiments, when the vehicle with the power transmission system 100 is in some conditions, power generated by the engine 4 and the first motor generator 51 may be transmitted between the first motor power shaft gear 31 and the corresponding shift driving gear. At the same time, the first motor power shaft gear 31 may rotate together with the corresponding shift driving gear.

In the specification of the present disclosure, the expression "rotate together with" means that related components (such as two components) may rotate together. In an embodiment that one component rotates together with the other one component, when the one component rotates, the other one component rotates together.

In some embodiments that a gear rotates together with a shaft, when the gear rotates, the relative shaft rotates together. Alternatively, when the shaft rotates, the relative gear rotates together.

In some embodiments that one shaft rotates together with the other shaft, when one shaft rotates, the other shaft rotates together.

In some embodiments that one gear rotate together with the other one gear, when the one gear rotates, the other one gear rotates together.

In the following description, the expression "rotate together with" may be understood as described above, unless specified or limited otherwise.

In some embodiments, the first motor generator 51 may be configured to rotate together with the motor power shaft 3. For example, when functioning as a motor, the first motor generator 51 outputs the power to the motor power shaft 3. In some embodiments, when functioning as a generator, power form the motor power shaft 3 may be transmitted to the first motor generator 51, thereby driving the first motor generator 51 to generate electric power.

In the specification of the present disclosure, a motor generator (such as the first motor generator 51) may be understood as an apparatus which can function as a motor and a generator, unless specified or limited otherwise.

In some embodiments, the first motor power shaft gear 31 may rotate together with one of the shift driving gear. Specially, when the motor power shaft gear 31 is rotating together with corresponding shift driving gear, the first motor generator 51 may use at least a part of power generated by the engine 4 to generate electric power when the vehicle is parked or running.

In some embodiments, when the vehicle is running and the first motor power shaft gear 31 is rotating together with the corresponding shift gear, at least a part of power generated by the engine 4 may be transmitted to the first motor generator 51 via the shift driving gear, the first motor power shaft gear 31 and the motor power shaft 3, such that the first motor generator 51 is driven to generate electric power, thus accomplishing a condition of charging the vehicle while driving.

In some embodiments, when the vehicle is in a parking state (e.g., the vehicle stops running but the engine is still working, such as the engine 4 is idling) and the first motor power shaft gear 31 is rotating together with the corresponding shift driving gear, a part of power generated by the engine 4 may be transmitted to the first motor generator 51 via the shift driving gear, the first motor power shaft gear 31 and the motor power shaft 3 such that the first motor generator 51 is driven to generate electric power, thus accomplishing a condition of charging the vehicle while parked (such as charging the vehicle while the vehicle is not running). Therefore, both the charging efficiency and the fuel economy of the engine are improved.

In some embodiments, the second motor power shaft gear 32 may be configured to rotate together with the motor power output gear 6. In some embodiments, the power transmitted to the second motor power shaft gear 32 may be transmitted to the motor power output gear 6. In some embodiments, the power transmitted to the motor power output gear 6 may be transmitted to the second motor power shaft gear 32.

In some embodiments, the power generated by the first motor generator 51 may be transmitted to the output shaft with motor power output gear 6, such as the second output shaft 22, via the second motor power shaft gear 32 and the motor power output gear 6, so as to be output, thus accomplishing the pure electric mode and the hybrid mode.

In some embodiments, when the second motor power shaft gear 32 rotates together with the motor power shaft output gear 6, the first motor generator 51 can be a generator to output power, thus driving the vehicle, which may not be construed as a limitation. In some embodiments, the motor power shaft output gear 6 may fit over the second output shaft and configure to mesh with the second motor power shaft gear 32.

In some embodiments, the motor power shaft 3 may be a motor shaft of the first motor generator 51. In some embodiments, the motor power shaft 3 may be a shaft different from the motor shaft of the first motor generator 51.

In some embodiments, as shown in FIG. 1, the output idler gear 34 is fitted over the motor power shaft 3. In other words, the output idler gear 34 and the motor power shaft 3 may rotate at different speeds. An output idler gear synchronizer 34c is fitted over the motor power shaft 3 and configured to engage with the output idler gear 34, such that the output idler gear 34 can rotate together with the motor power shaft 3.

In the present embodiments, when the output idler gear synchronizer 34c is in a disengage state, power generated by the first motor generator may not be output via the output idler gear 34. When the output idler gear synchronizer 34 engages with the output idler gear 34, the power generated by the first motor generator 51 may be transmitted to the output idler gear via the motor power shaft 3 and the output idler gear synchronizer 34c, so as to be output, thus shortening the transmission passage, reducing the transmission components and enhancing the transmission efficiency. The pure electric mode and the hybrid mode (with the engine 4) can be achieved, and the charging function of the first motor generator can be accomplished via this transmission passage.

With the power transmission system 100 according to embodiments of the present disclosure, the number of charging modes of the vehicle can be increased. For example, the charging of a vehicle battery can take place either when the vehicle is running or when the vehicle is parked. Therefore, different charging modes can be provided, and charging efficiency can be improved.

The detailed configuration of the transmission unit 101 may be described in detail below with reference to detailed embodiments as shown in FIGS. 1-10.

The transmission modes of the first motor power shaft gear 31 and the corresponding shift driving gear may be described in detail below. In some embodiments, the first motor power shaft gear 31 may mesh with one of the shift driving gear via the transmission idler gear 71. In other words, the first motor power shaft gear 31 may not mesh with the shift driving gear directly, but via a transmission idler gear 71. In some embodiments, the transmission idler gear 71 may fit over one of the output shafts. In other words, the transmission idler gear 71 and the motor power shaft output gear 6 may be disposed on the same output shaft.

In some embodiments, the first motor power shaft gear 31 may mesh with the corresponding shift driving gear via the transmission idler gear 71, such that the engine 4 may accomplish the reverse mechanism via the shift driving gear, the transmission idler gear and the first motor power shaft gear 31. The transmission idler gear 71 may be a joint gear structure so as to achieve a better reverse velocity ratio.

In some embodiments, one gear part 711 of the joint gear structure may mesh with a shift driving gear (such as the second-gear shift driving gear 2a). The other gear part 712 may mesh with the first motor power shaft gear 31. With a reasonable designing of the number of teeth of two gear parts, a better reverse velocity ratio can be obtained.

In some embodiments, as shown in FIGS. 1-10, the first motor power shaft gear 31 is fitted over the motor power shaft 3. A motor power shaft synchronizer 33c may be disposed on the motor power shaft 3 and configure to engage with the first motor power shaft gear 31. In other words, when the motor power shaft synchronizer 33c is in a disengaged state, the first motor power shaft gear 31 and the motor power shaft 3 may rotate at different speeds. When the motor power shaft synchronizer 33c is in an engaged state, the first motor power shaft gear 31 may rotate together with the motor power shaft 3.

In some embodiments, the second motor power shaft gear 32 is fixed on the motor power shaft 3. The motor power shaft output gear 6 is fitted over the corresponding output shaft, and a motor power shaft output gear synchronizer 6c is disposed on the output shaft and configure to engage with the motor power shaft output gear 6. As shown in FIG. 1, the motor power shaft output gear 6 is fitted over the second output shaft 22. When the motor power shaft output gear synchronizer 6c is in a disengaged state, the motor power shaft output gear 6 and the second output shaft 22 may rotate at different speeds. When the motor power shaft output gear synchronizer 6c is in an engaged state, the motor power shaft output gear 6 may rotate together with the second output shaft 22.

In some embodiments, the motor power shaft output gear synchronizer 6c and the motor power shaft synchronizer 33c may share a shift fork mechanism. When the shift fork mechanism drive the motor power shaft output gear synchronizer 6c to engage with the motor power shaft output gear 6, the motor power shaft synchronizer 33c is in a disengaged state. When the shift fork mechanism drive the motor power shaft synchronizer 33c to engage with the first motor power shaft gear 31, the motor power shaft output gear synchronizer 6c is in a disengaged state.

With the sharing shift fork mechanism, the engaged state of the motor power shaft output gear synchronizer 6c and the motor power shaft synchronizer 33c can be controlled. The shift fork mechanism can drive only one of the two synchronizers in an engaged state during one time period. At the same time, the other synchronizer is in a disengaged state. Such that the number of the shift fork mechanisms can be saved and the power transmission system 100 can have a more compact structure and a smaller size.

The input shaft(s), the output shaft(s), the shift driving gears, and the shift driven gears of the power transmission system 100 will be described below with reference to embodiments shown in FIGS. 1-10.

In some embodiments, as shown in FIGS. 1-10, two input shafts are provided. In the present embodiment, the plurality of input shafts includes a first input shaft 11 and a second input shaft 12. The second input shaft 12 may be hollow and the first input shaft 11 may be solid. One part of the first input shaft 11 may be inserted within the second input shaft 12, and the other part of the first input shaft 11 may extend out of the second input shaft 12 along an axial direction of the second input shaft 12. The first input shaft 11 and the second input shaft 12 may be arranged coaxially.

In some embodiments, two output shafts are provided. In the present embodiment, the plurality of output shafts may include a first output shaft 21 and a second output shaft 22. The first output shaft 21 and the second output shaft 22 may be arranged coaxially with the input shafts (such as the first input shaft 11 and the second input shaft 12). Both the first output shaft 21 and the second output shaft 22 may be solid.

In some embodiments, the power transmission system 100 according to embodiments of the present disclosure may have five gear transmission types. Specifically, odd-numbered gear shift driving gears may be arranged on the first input shaft 11, while even-numbered gear shift driving gear may be arranged on the second input shaft 12. The first input shaft 11 may transmit power from gear pairs of odd-numbered gears, and the second input shaft 12 may transmit power from gear pairs of even-numbered gears.

In some embodiments, as shown in FIGS. 1-10, a first-gear shift driving gear 1a, a third-gear shift driving gear 3a, and a fifth-gear shift driving gear 5a may be arranged on the first input shaft 11. A second-gear shift driving gear 2a, and a fourth-gear shift driving gear 4a may be arranged on the second input shaft 12. Each of the first-gear to fifth-gear shift driving gears 1a, 2a, 3a, 4a, and 5a may rotate together with a corresponding input shaft.

In some embodiments, a first-gear shift driven gear 1b, a second-gear shift driven gear 2b, a third-gear shift driven gear 3b and a fourth-gear shift driven gear 4b may be disposed on the first output shaft 21, and a fifth-gear shift driven gear 5b may be disposed on the second output shaft 22. Each of the shift driven gears 1b, 2b, 3b, 4b, and 5b may be fitted over a corresponding output shaft. Each of the shift driven gears and the corresponding output shafts may rotate at different speeds.

In some embodiments, the first-gear shift driving gear 1a may mesh with the first-gear shift driven gear 1b to form one gear pair, the second-gear shift driving gear 2a may mesh with the second-gear shift driven gear 2b to form one gear pair, the third-gear shift driving gear 3a may mesh with the third-gear shift driven gear 3b to form one gear pair, the fourth-gear shift driving gear 4a may mesh with the fourth-gear shift driven gear 4b to form one gear pair, and the fifth-gear shift driving gear 5a may mesh with the fifth-gear shift driven gear 5b to form one gear pair so that five pairs of gear pairs can be formed.

As the shift driven gear is fitted over the corresponding output shaft, a synchronizer is provided to synchronize the shift driven gear with the corresponding output shaft, thus achieving the object of power transmission.

In some embodiments, as shown in FIGS. 1-10, the power transmission system 100 includes a first-third gear synchronizer 13c, a second-fourth gear synchronizer 24c, and a fifth gear synchronizer 5c.

In some embodiments, as shown in FIG. 1, the first-third gear synchronizer 13c is disposed on the first output shaft 21 and between the first-gear shift driven gear 1b and the third-gear shift driven gear 3b. The first-third gear synchronizer 13c may engage the first output shaft 21 with the first-gear shift driven gear 1b or the third-gear shift driven gear 3b, such that the shift driven gear may rotate together with the corresponding output shaft. For example, the first-gear shift driven gear 1*b* may rotate together with the first output shaft 21, or the third-gear shift driven gear 3*b* may rotate together with the first output shaft 21.

In some embodiments, as shown in FIG. 1, the first-third gear synchronizer 13*c* includes an engaging sleeve. In some embodiments, the engaging sleeve of the first-third gear synchronizer 13*c* may move to the left so as to engage the third-gear shift driven gear 3*b* with the first output shaft 21, such that the third-gear shift driven gear 3*b* may rotate together with the first output shaft 21. In some embodiments, the engaging sleeve of the first-third gear synchronizer 13*c* may move to the right so as to engage first-gear shift driven gear 1*b* with the first output shaft 21, such that the first-gear shift driven gear 1*b* may rotate together with the first output shaft 21.

In some embodiments, as shown in FIG. 1, the second-fourth gear synchronizer 24*c* is disposed on the first output shaft 21 and between the second-gear shift driven gear 2*b* and the fourth-gear shift driven gear 4*b*. The second-fourth gear synchronizer 24*c* may engage the second-gear shift driven gear 2*b* with the first output shaft 21 or engage the fourth-gear shift driven gear 4*b* with the first output shaft 21, such that the shift driven gear may rotate together with the corresponding output shaft. For example, the second-gear shift driven gear 2*b* may rotate together with the first output shaft 21, or the fourth-gear shift driven gear 4*b* may rotate together with the first output shaft 21.

In some embodiments, as shown in FIG. 1, the second-fourth gear synchronizer 24*c* includes an engaging sleeve. In some embodiments, the engaging sleeve of the second-fourth gear synchronizer 24*c* may move to the left so as to engage the second-gear shift driven gear 2*b* with the first output shaft 21, such that the second-gear shift driven gear 2*b* may rotate together with the first output shaft 21. In some embodiments, the engaging sleeve of the second-fourth gear synchronizer 24*c* may move to the right so as to engage fourth-gear shift driven gear 4*b* with the first output shaft 21, such that the fourth-gear shift driven gear 4*b* may rotate together with the first output shaft 21.

In some embodiments, as shown in FIG. 1, the fifth gear synchronizer 5*c* is disposed on the second output shaft 22 and located on a side, such as left side, of the fifth-gear driven gear 5*b*. The fifth gear synchronizer 5*c* may engage the fifth-gear driven gear 5*b* with the second output shaft 22. In some embodiments, the fifth gear synchronizer 5*c* includes an engaging sleeve, which may move rightward to engage the fifth-gear driven gear 5*b* with the second output shaft 22, such that the fifth-gear driven gear 5*b* and the second output shaft 22 may rotate synchronously.

In some embodiments of the present disclosure, the engine 4 may transmit power to, or disengage from, the first input shaft 11 and the second input shaft 12 via a dual clutch 2*d*.

In some embodiments of the present disclosure, as shown in FIGS. 1-10, the dual clutch 2*d* includes an input terminal 23*d*, a first output terminal 21*d*, and a second output terminal 22*d*. The engine 4 is connected with the input terminal 23*d* of the dual clutch 2*d*. In some embodiments, the engine 4 is connected with the input terminal 23*d* by at least one selected from a group consisting of a flywheel, a damper, a torsional disk, etc.

In some embodiments, the first output terminal 21*d* is connected with the first input shaft 11, such that the first output terminal 21*d* may rotate together with the first input shaft 11. In some embodiments, the second output terminal 22*d* is connected with the second input shaft 12, such that the second output terminal 22*d* may rotate together with the second input shaft 12.

In some embodiments, the input terminal 23*d* may include a shell of the dual clutch 2*d*, and each of the first output terminal 21*d* and the second output terminal 22*d* may include one driven disk of the dual clutch 2*d*. In some embodiments, the shell is disengaged from the driven disk, i.e. the input terminal 23*d* is disengaged from the first output terminal 21*d* and is disengaged from the second output terminal 22*d*. When the shell is to be engaged with one driven disk, the shell can be controlled to engage with a corresponding driven disk, thus the shell and this driven disk may rotate together. In the present embodiment, the input terminal 23*d* may engage with one of the first output terminal 21*d* and the second output terminal 22*d* to transmit power from the input terminal 23*d* to one of the first output terminal 21*d* and the second output terminal 22*d*, to output the transmitted power.

In some embodiments, the shell may be engaged with two driven disks simultaneously. In the present embodiment, the input terminal 23*d* is engaged with both the first output terminal 21*d* and the second output terminal 22*d*, and thereby power from the input terminal 23*d* may be transmitted to the first output terminal 21*d* and the second output terminal 22*d* so as to be output.

In some embodiments, the engaging state of the dual clutch 2*d* may be controlled according to practical condition, and that the engaging state may also be adjusted accordingly based on a current transmission mode. In some embodiments, the input terminal 23*d* may disengage from the two output terminals including, for example, the first output terminal 21*d* and the second output terminal 22*d*. In some embodiments, the input terminal 23*d* may engage with at least one of the two output terminals including, for example, the first output terminal 21*d* and the second output terminal 22*d*.

In some embodiments, the power transmission system 100 further includes three power output shafts, i.e. a first output shaft 21, a second output shaft 22, and a motor power shaft 3. These power output shafts, a differential 75, and relationships therebetween may be described below in detail with reference to FIGS. 1-10.

In some embodiments, the differential 75 may be disposed between a pair of front wheels 76 of the vehicle. In some embodiments, the differential 75 may be disposed between a pair of rear wheels 77 of the vehicle. The differential 75 may drive the wheels to the left or to the right when the vehicle is turning or running on a rough road, such that the wheels may roll with different angular speeds, and therefore driving wheels at both sides of the vehicle may perform only rolling on the ground. In some embodiments, a shift driven gear 74 of a main reducer may be disposed on the differential 75, for example, the shift driven gear 74 may be disposed on a shell of the differential 75. In some embodiments, the shift driven gear 74 may be a bevel gear, which may not be construed as a limitation.

In some embodiments, a first output shaft gear 211 may be fixed on the first output shaft 21 and configured to rotate together with the first output shaft 21 and mesh with the shift driven gear 74 of a main reducer. Thus the power from the first output shaft 21 may be transmitted to the shift driven gear 74 and the differential 75 via the first output shaft gear 211.

In some embodiments, the second output shaft gear 221 may be fixed on the second output shaft 22 and configured to rotate together with the second output shaft 22 and mesh with shift driven gear 74. Thus the power from the second output shaft 22 may be transmitted to the shift driven gear 74 and the differential 75 via the second output shaft gear 221.

In some embodiments, the output idler gear 34 may mesh with the shift driven gear 74 and output power from the motor power shaft 3. Such that the power from the motor power shaft 3 may be transmitted to the differential 75 via a synchronization of the output idler gear synchronizer 34c, the output idler gear 34 and the shift driven gear 74.

The power transmission system 100 according to embodiments of the present disclosure may be used in various different conditions, such as a parking-charging condition (for example, charging the vehicle while the vehicle is parked), a running-charging condition (for example, charging the vehicle while the vehicle is running and both clutch parts of dual clutch 2d are engaged), and the reverse mode.

In the parking-charging condition, the engine 4 is configured to generate power and output the power to the first motor generator 51 via the generator gear 73 and the motor power shaft gear 31, thereby driving the first motor generator 51 to generate electric power.

In some embodiments, as shown in FIGS. 1-10, in the parking-charging state, the engine 4 generates power and transmits the power to the second input shaft 12 via the dual clutch 2d. The second-gear shift driving gear 2a on the second input shaft 12 may rotate together with the first motor power shaft gear 31 on the motor power shaft 3 via the transmission idler gear 71. The motor power shaft synchronizer 33c engages with the motor power shaft 3 and the first motor power shaft gear 31, such that power generated by the engine 4 may be transmitted to the first motor generator 51 via the second input shaft 12, the second shift driving gear 2a, the transmission idler gear 71, the first motor power shaft gear 31, the motor power shaft synchronizer 33c, and the motor power shaft 3 sequentially, thus driving the first motor generator 51 to generate electric power.

Therefore, charging the vehicle when the vehicle is parked may be achieved, and the number of charging modes is increased. In the parking-charging mode, the vehicle is not running, and all power from the engine 4 may be used to charge the vehicle, thus providing a fast charging performance and enhancing the charging efficiency.

In the running-charging condition, the input terminal 23d is engaged with the first output terminal 21d and the second output terminal 22d simultaneously, a part of power generated by the engine 4 may be output to one of the output shafts to drive the wheels of the vehicle, and the other part of power may be transmitted to the first motor generator 51 via the first motor power shaft gear 31, thus driving the first motor generator 51 to generate electric power.

In the running-charging condition, as shown in FIGS. 1-10, a part of power generated by the engine 4 may be transmitted to the third-gear gear pair or the fifth-gear gear pair via the first input shaft 11 and the first-gear gear pair. The other part of the power generated by the engine 4 may be transmitted to the first motor generator 51 via the second input shaft 12, the second-gear shift driving gear 2a, the transmission idler gear 71, the first motor power shaft gear 31, the motor power shaft synchronizer 33c, and the motor power shaft 3 sequentially, thus driving the first motor generator 51 to generate electric power.

It is known to those skilled in the art that, a conventional dual clutch generally has two gear parts, and only one gear part is used when the dual clutch is working. In the power transmission system 100 according to embodiments of the present disclosure, however, two gear parts of the dual clutch 2d may be both engaged (for example, the input terminal 23d is engaged with the first output terminal 21d and the second output terminal 22d simultaneously) when the dual clutch 2d is working. In the present embodiment, a part of power from the engine 4 may be output to wheels of the vehicle via one output shaft to drive the vehicle to run, and the other part of power from the engine 4 may be transmitted to the first motor generator 51 to drive the first motor generator 51 to generate electric power. In this way, the number of the transmission modes of the vehicle is increased, and charging the vehicle while the vehicle is running may be achieved.

In the power transmission system 100 according to embodiments of the present disclosure, a mechanical reverse mode, an electric reverse mode and a hybrid (both mechanical and electric) reverse mode may be achieved.

In the mechanical reverse mode, the reverse of the vehicle is accomplished with power from the engine 4. Specifically, the engine 4 generates power and transmits the power to the output idler gear 34 via the first motor power shaft gear 31 and a synchronization of the motor power shaft synchronizer 33c (synchronizing the first motor power shaft gear 31 with the motor power shaft 3) and a synchronization of output idler gear synchronizer 34c (synchronizing the output idler gear 34 with the motor power shaft 3).

In the mechanical reverse mode, the motor power shaft synchronizer 33c engages with the first motor power shaft gear 31, and the output idler gear synchronizer 34 engages with the output idler gear 34. Power generated by the engine 4 may be transmitted to the output idler gear via the second input shaft 12, the second-gear shift driving gear 2a, the transmission idler gear 71, the first motor power shaft gear 31, the motor power shaft synchronizer 33c, the motor power shaft 3 and the output idler gear synchronizer 34c, thus accomplishing reverse of the vehicle.

In the mechanical reverse mode, the motor power shaft synchronizer 33c synchronizes the first motor power shaft gear 31 and the output idler gear synchronizer 34c synchronizes the output idler gear 34.

In the electric reverse mode, the reverse of the vehicle can be enabled with power from the first motor generator 51.
Condition 1

In the first electric reverse mode, power generated by the first motor generator 51 may be transmitted to the output idler gear 34 via a synchronization of the output idler gear synchronizer 34c (synchronizing the output idler gear 34). In the first electric reverse mode, the output idler gear synchronizer 34c may engage with the output idler gear 34, such that power generated by the first motor generator 51 may be transmitted to the output idler gear 34 via the motor power shaft 3 and the output idler gear synchronizer 34c, as to reverse the vehicle. In this condition, the transmission passage has shorter hinges, less transmission components and higher efficiency, which can be regarded as the direct reverse transmission passage of the first motor generator 51.

In the first condition, only the output idler gear synchronizer 34c engages with the output idler gear 34.
Condition 2

In the second electric reverse mode, power generated by the first motor generator 51 may be transmitted to the output shaft with the motor power output gear 6 via a synchronization of the motor power output gear synchronizer 6c (synchronizing the motor power output gear 6). Specifically, as shown in FIGS. 1-10, in this mode, the motor power shaft gear synchronizer 6c engages with the second output shaft 22 and the motor power output gear 6. Power generated by the first motor generator 51 may be transmitted to the second output shaft gear 221 via the motor power shaft 3, the second motor power shaft gear 32, the motor power output gear 6, the motor power output gear 6c, and the second output shaft 22, so as to reverse the vehicle. Therefore, more reverse transmission passages can be provided.

In the second condition, only the motor power output gear synchronizer 6c is in an engaged state.

In the hybrid reverse mode, the reverse of the vehicle may be achieved with the engine 4 and the first motor generator 51. The hybrid reverse mode may be a combination of the above-mentioned mechanical reverse mode and the electric reverse mode.

In the hybrid reverse mode, the engine 4 may generate first power and the transmit the first power to the output idler gear 34 via the first motor power shaft gear 31, a synchronization of the motor power shaft synchronizer 33c (synchronizing the first motor power shaft gear 31 with the motor power shaft 3), and a synchronization of the output idler gear synchronizer 34c (synchronizing the output idler gear 34). At the same time, the first motor generator 51 may generate second power and transmit the second power to the output idler gear 34 via a synchronization of the output idler gear synchronizer 34c (synchronizing the output idler gear 34).

In some embodiments, when the power transmission system 100 is in the hybrid reverse mode, the above-mentioned mechanical reverse mode and the electric reverse mode are combined. The engine 4 may transmit the first power to the output idler gear 34 as described in the above-mentioned mechanical reverse mode. The first motor generator 51 may transmit the second power to the output idler gear 34 as described in the above-mentioned electric reverse mode. The first power and the second power may be coupled together before being output to the wheels. In some embodiments, the first power and the second power may be coupled at the output idler gear 34 and the coupled power may be transmitted to the wheels so as to reverse the vehicle.

In the hybrid reverse mode, the motor power shaft synchronizer 33c synchronizes the first motor power shaft gear 31, and the output idler gear synchronizer 34c synchronizes the output idler gear 34.

As described, with the power transmission system 100 according to embodiments of the present disclosure, three reverse modes including the mechanical reverse mode, the electric reverse mode, and the hybrid reverse mode may be achieved, thus increasing the number of the reverse modes and facilitating a user to shift between the three reverse modes according to a practical condition. Therefore different driving requirements may be satisfied.

When the vehicle has sufficient electric power, the electric reverse mode may be used. In the electric reverse mode, harmful exhaust gases can be minimized, and the energy consumption can be reduced. It is known to those skilled in the art that, an unskilled driver will take longer time and more maneuvers to park the vehicle at a predetermined position. Considering that the engine 4 may generate more harmful gases during a low-speed reverse process and that the engine 4 has relatively higher fuel consumption, because the engine is at an uneconomical rotating speed during the reverse process, the electric reverse mode of the present disclosure is highly effective in reducing fuel consumption during such a low-speed reverse process. In addition, with the generator being used as a power source, harmful exhaust gases can be minimized, and the energy consumption in a low-speed reverse process can also be decreased. Therefore, the fuel economy of the engine 4 may be enhanced.

When the vehicle has insufficient or relatively less electric power, the mechanical reverse mode may be used. In case that the vehicle needs to be reversed quickly or that the vehicle needs to be reversed with a larger power, the hybrid reverse mode may be used, thus enhancing the power of the vehicle and providing better driving experience to the user.

It should be noted that, the above-mentioned three reverse modes being applied in specific cases may be schematic examples provided for better understanding of the present disclosure, which may not be construed that the described reverse modes should be applied when the vehicle is in the corresponding case. It is well known to those skilled in the art that, in a specific condition, a corresponding reverse mode may be selected according to specific requirements and a practical condition.

With the power transmission system 100 according to embodiments of the present disclosure, the number of the reverse modes of the vehicle is increased, which provide a driver more options to reverse the vehicle. In this way, the driver may be provided more driving fun, and reverse of the vehicle in different road conditions may be satisfied.

In some embodiments, as shown in FIGS. 6-10, the power transmission system 100 further includes a second motor generator 52. With the second motor generator 52, the power of the power transmission system 100 may be improved, and more transmission modes can be provided.

In some embodiments, the second motor generator 52 may perform power transmission with the shift driven gear 74 of the main reducer. For example, a gear may be disposed on a motor shaft of the second motor generator 52, and the gear is configured to directly mesh with the shift driven gear 74 so as to perform power transmission. In some embodiments, the second motor generator 52 is configured to connect with the first input shaft 11 or the first output shaft 21. In some embodiments, the second motor generator 52 may be integral with the differential 75. In some embodiments, the engine 4 and the first motor generator 51 are configured to drive front wheels of the vehicle, and the second motor generator 52 may be a wheel-side motor and configured to drive rear wheels. In some embodiments, the second motor generator 52 may drive the pair of rear wheels via a reducing mechanism. In some embodiments, two second motor generators 52 are provided, and each second motor generator 52 is configured to drive one rear wheel via a reducing mechanism.

In some embodiments, as shown in FIGS. 2-5 and FIGS. 7-10, the power transmission system 100 may include an electric differential lock unit. The electric differential lock unit may lock a pair of driving wheels when the vehicle is skidding, thus enhancing the antiskid performance and the pass performance of the vehicle.

In some embodiments, as shown in FIGS. 2-5 and FIGS. 7-10, the electric differential lock unit may include a third motor generator 201, a fourth motor generator 301, and an antiskid synchronizer 503. The engine 4 and/or the first motor generator 51 is configured to drive a first pair of wheels 76. The third motor generator 201 and the fourth motor generator 301 are configured to drive a second pair of wheels 77. The first pair of wheels 76 are one pair of the pair of front wheels and the pair of the rear wheels, and the second pair of wheels 77 are the other one pair of the pair of front wheels and the pair of the rear wheels. In some embodiments, as shown in FIGS. 2-5, the engine and the first motor generator 51 may drive the pair of front wheels, and the third motor generator 201 and the fourth motor generator 301 may drive the pair of rear wheels.

In some embodiments, as shown in FIGS. 2-5 and FIGS. 7-10, the third motor generator 201 is configured to rotate together with one of the second pair of wheels 77. In the present embodiment, the third motor generator 201 may output power to this one wheel so as to drive this one wheel to rotate. In some embodiments, power from this one wheel may be transmitted to the third motor generator 201, thus driving the third motor generator 201 to generate electric power.

In some embodiments, the fourth motor generator 301 is configured to rotate together with the other one of the second pair of wheels 77. In the present embodiment, the fourth motor generator 301 may output power to the other one wheel so as to drive the other wheel to rotate. In some embodiments, power from the other wheel may be transmitted to the fourth motor generator 301, thus driving the fourth motor generator 301 to generate electric power. In some embodiments, as shown in FIGS. 2-5 and FIGS. 7-10, the third motor generator 201 is configured to rotate together with a left rear wheel of the vehicle, and the fourth motor generator 301 is configured to rotate together with a right rear wheel of the vehicle. This embodiment is provided for example, and the present disclosure should not be construed to be limited by this embodiment.

In some embodiments, the antiskid synchronizer 503 is configured to selectively synchronize the second pair of wheels 77, such that the second pair of wheels 77 may rotate together. In the present embodiment, the antiskid synchronizer 503 may synchronize the second pair of wheels 77, i.e. the antiskid synchronizer 503 is in an engaged state, such that the second pair of wheels 77 may form a fixed engagement. In this way, the second pair of wheels 77 may rotate together, instead of rotating at different rotating speeds.

In some embodiments, when the antiskid synchronizer 503 is in a disengaged state, the third motor generator 201 and the fourth motor generator 301 may drive corresponding wheels respectively, such that the corresponding wheels may rotate at different rotating speeds. Thus the object that different wheels rotate at different speeds may be achieved. In some embodiments, when the antiskid synchronizer 503 is in a disengaged state, the third motor generator 201 and the fourth motor generator 301 may drive the second pair of wheels 77 to rotate at the same rotational speed.

With the power transmission system 100 according to embodiments of the present disclosure, the third motor generator 201 and the fourth motor generator 301 are provided and configured to drive the second pair of wheels 77 respectively, and therefore the second pair of wheels 77 rotating at different rotational speeds may be achieved. When one of the second pair of wheels 77 is skidding, the antiskid synchronizer 503 may synchronize the second pair of wheels 77 such that the second pair of wheels 77 rotate together. In this way, power output by two motors (for example, the third motor generator 201 and the fourth motor generator 301) or one motor (for example, the third motor generator 201 or the fourth motor generator 301) may be coupled to drive the second pair of wheels 77 together, thus enhancing the antiskid capability and passing performance of the vehicle.

The power transmission system 100 according to embodiments of the present disclosure includes the antiskid synchronizer 503, and therefore a mechanical self-locking differential mechanism commonly used in an axle (such as a rear axle) in a conventional power transmission system may be avoided. In addition to the functions of the antiskid synchronizer 503 itself, the function of a mechanical self-locking differential mechanism are performed by the antiskid synchronizer 503, and therefore the power transmission system 100 according to embodiments of the present disclosure may have a more compact structure and relatively lower cost.

The third motor generator 201, the fourth motor generator 301, and transmission method thereof will be described below in detail with references to FIGS. 2-5 and FIGS. 7-10.

In some embodiments, as shown in FIGS. 2-4 and FIGS. 7-9, the third motor generator 201 may perform power transmission with the corresponding wheel via a gear mechanism. In some embodiments, the fourth motor generator 301 may perform power transmission with the corresponding wheel via a gear mechanism.

The gear mechanism has simple structure and is convenient for use in power transmission. In addition, with the gear mechanism, a required transmission ratio may be obtained and the power transmission may be reliable. In some embodiments, the third motor generator 201 and the fourth motor generator 301 may perform power transmission with corresponding wheel(s) via the same gear mechanism. In the present embodiment, the gear mechanism is common, and the power transmission system 100 may be highly symmetric, thus avoiding the situation that the center of gravity moves to one side. With one common gear mechanism, the center of gravity may be located right in the middle or substantially the middle of the two wheels, and both the stability and reliability of the power transmission system 100 may be improved.

In some embodiments, as shown in FIGS. 2-4 and FIGS. 7-9, the gear mechanism between the third motor generator 201 and the corresponding wheel may include a first gear 401, a second gear 402, a third gear 403, and a fourth gear 404.

In some embodiments, the first gear 401 may be disposed on the first output shaft 202 corresponding to the third motor generator 201, and the first gear 401 is configured to rotate together with the first output shaft 202. In some embodiments, the first output shaft 202 may output power generated by the third motor generator 201. In some embodiments, the first output shaft 202 may transmit power generated by the corresponding wheel to the third motor generator 201. In some embodiments, the first output shaft 202 and the third motor generator 201 may share the same motor shaft. In some embodiments, the motor shaft of the first output shaft 202 and the motor shaft the third motor generator 201 may be two individual parts different from each other. In the present embodiment, the motor shaft of the first output shaft 202 and the motor shaft the third motor generator 201 may be connected to each other.

In some embodiments, a first drive shaft 204 is connected with a wheel corresponding to the third motor generator 201, and the second gear 402 is disposed on the first drive shaft 204 and configured to rotate together with the first drive shaft 204. The third gear 403 and the first gear 401 are configured to mesh with each other, and the fourth gear 404 and the second gear 402 are configured to mesh with each other. The third gear 403 and the fourth gear 404 are coaxially arranged and may rotate together.

In some embodiments, as shown in FIGS. 2-4 and FIGS. 7-9, the gear mechanism between the fourth motor generator 301 and the corresponding wheel may include a fifth gear 405, a sixth gear 406, a seventh gear 407, and an eighth gear 408. The fifth gear 405 may be disposed on the second output shaft 302 corresponding to the fourth motor generator 301, and the fifth gear 405 is configured to rotate together with the second output shaft 302. In some embodiments, the second output shaft 302 may output power generated by the fourth motor generator 301. In some embodiments, the second output shaft 302 may transmit power generated by the corresponding wheel to the fourth motor generator 301. In some embodiments, the second output shaft 302 and the fourth motor generator 301 may share one motor shaft. In some embodiments, the motor shaft of the second output shaft 302 and the motor shaft the fourth motor generator 301 may be two individual parts different from each other. In the present embodiment, the motor shaft of the second output shaft 302 and the motor shaft the fourth motor generator 301 may be connected to each other.

In some embodiments, a second drive shaft 304 is connected with a wheel corresponding to the fourth motor generator 301, and the sixth gear 406 is disposed on the second drive shaft 304 and configured to rotate together with the second drive shaft 304. The seventh gear 407 and the fifth gear 405 are configured to mesh with each other, and the eighth gear 408 and the sixth gear 406 are configured to mesh with each other. The seventh gear 407 and the eighth gear 408 are coaxially arranged and may rotate together.

In some embodiments, the first gear 401 and the fifth gear 405 may have the same structure, such as having the same size and the same teeth number. In some embodiments, the second gear 402 and the sixth gear 406 may have the same structure, such as having the same size and the same teeth number. In some embodiments, the third gear 403 and the seventh gear 407 may have the same structure, such as having the same size and the same teeth number. In some embodiments, the fourth gear 404 and the eighth gear 408 may have the same structure, such as having the same size and the same teeth number. Therefore, versatility of the gear mechanism may be improved.

In some embodiments, the third gear 403 and the fourth gear 404 may be fixed on the first gear shaft 501, and the seventh gear 407 and the eighth gear 408 may be fixed on the second gear shaft 502. In some embodiments, the third gear 403 and the fourth gear 404 may form a substantial ladder shape or a joint gear structure. In some embodiments, the seventh gear 407 and the eighth gear 408 may form a substantial ladder shape or a joint gear structure.

Figure 2:
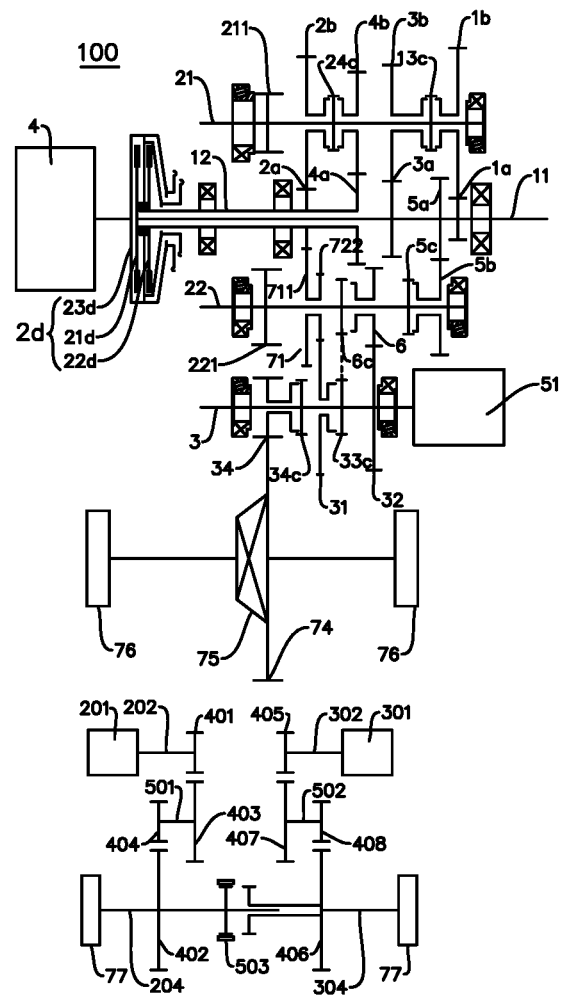
FIG. 2 is a schematic view of an exemplary power transmission system according to another embodiment of the present disclosure.

In some embodiments, as shown in FIG. 2 and FIG. 6, the antiskid synchronizer 503 may be disposed on the first drive shaft 204 and configured to selectively engage with the sixth gear 406. In some embodiments, a gear ring may be provided on a side of the sixth gear 406 facing the antiskid synchronizer 503, and the antiskid synchronizer 503 may include an engaging sleeve to adapt to the gear ring. With the engagement of the antiskid synchronizer 503, the second pair of wheels 77 may rotate together.

Figure 3:
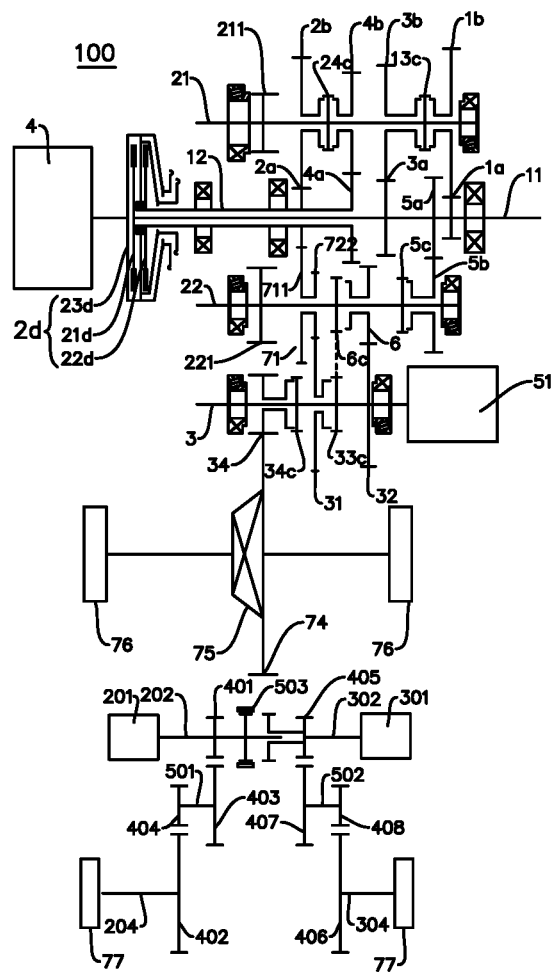
FIG. 3 is a schematic view of an exemplary power transmission system according to another embodiment of the present disclosure.
Figure 7:
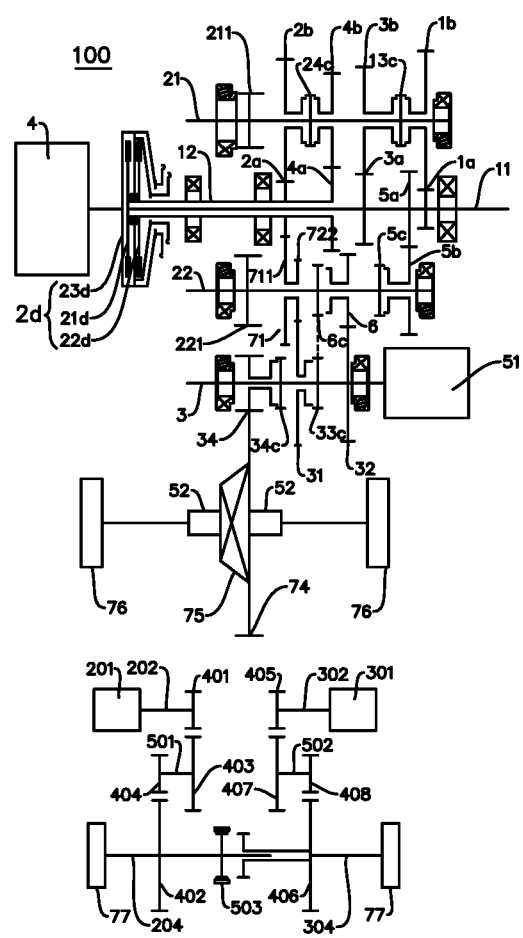
FIG. 7 is a schematic view of an exemplary power transmission system according to another embodiment of the present disclosure.

In some embodiments, as shown in FIG. 3 and FIG. 7, the antiskid synchronizer 503 may be disposed on the first output shaft 202 and configured to selectively engage with the fifth gear 405. In some embodiments, a gear ring may be provided on a side of the fifth gear 405 facing the antiskid synchronizer 503, and the antiskid synchronizer 503 may include an engaging sleeve to adapt to the gear ring. With the engagement of the antiskid synchronizer 503, the second pair of wheels 77 may rotate together.

Figure 4:
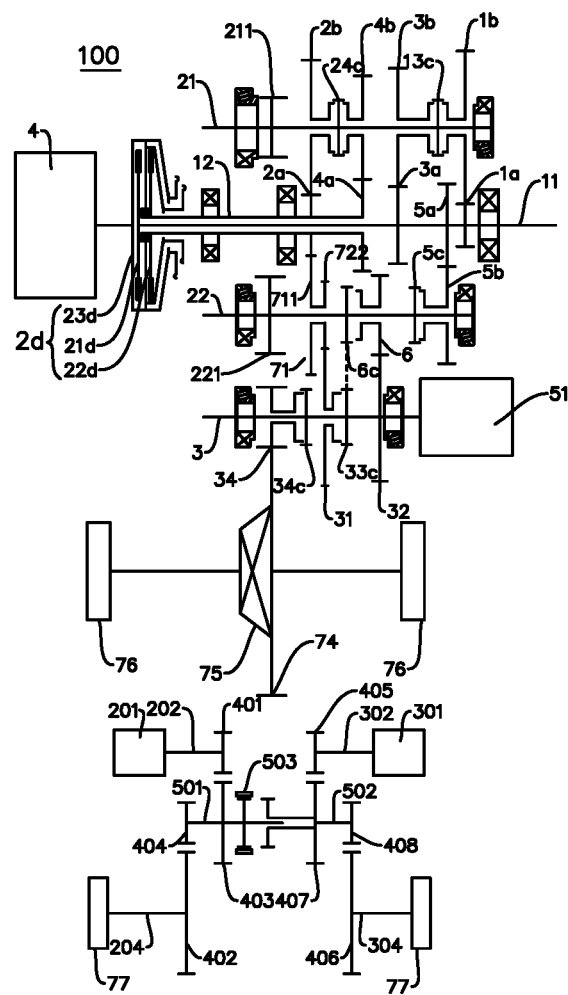
FIG. 4 is a schematic view of an exemplary power transmission system according to another embodiment of the present disclosure.
Figure 8:
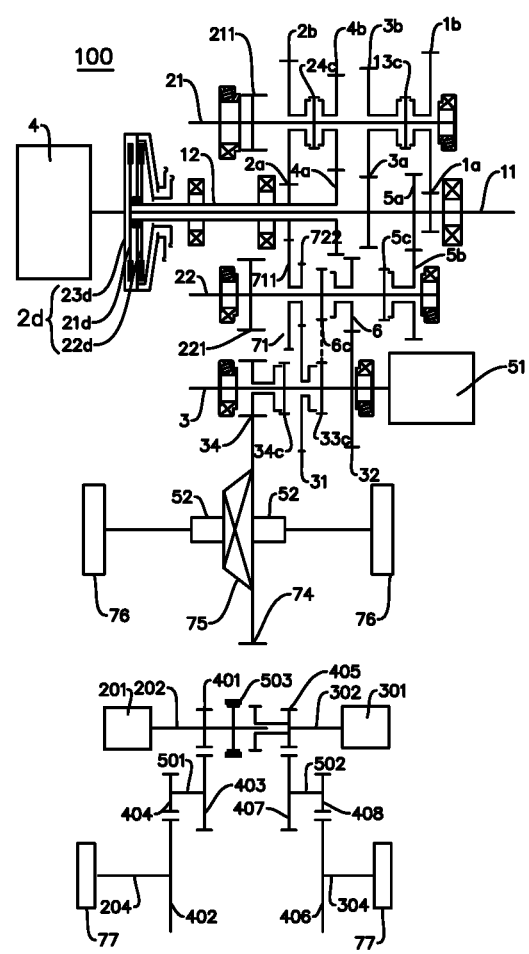
FIG. 8 is a schematic view of an exemplary power transmission system according to another embodiment of the present disclosure.
Figure 9:
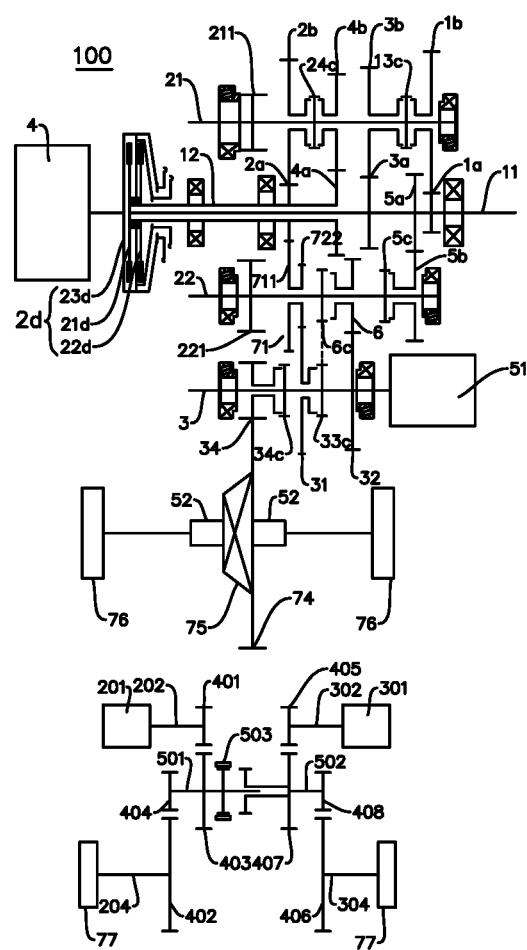
FIG. 9 is a schematic view of an exemplary power transmission system according to another embodiment of the present disclosure.

In some embodiments, as shown in FIG. 4 and FIG. 8, the antiskid synchronizer 503 may be disposed on the first gear shaft 501 and configured to selectively engage with the seventh gear 407. In some embodiments, a gear ring may be provided on a side of the seventh gear 407 facing the antiskid synchronizer 503, and the antiskid synchronizer 503 may include an engaging sleeve to adapt to the gear ring. With the engagement of the antiskid synchronizer 503, the second pair of wheels 77 may rotate together.

Figure 5:
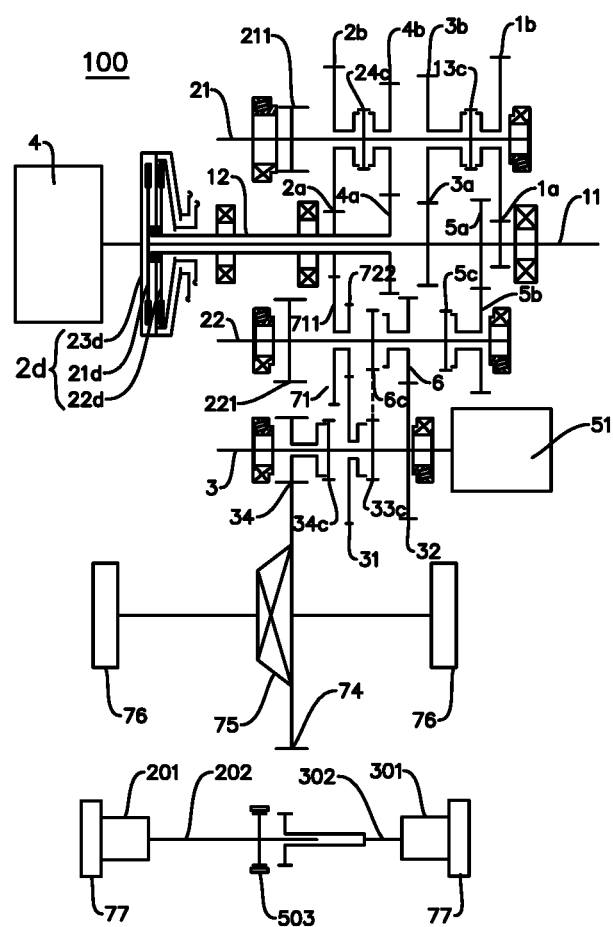
FIG. 5 is a schematic view of an exemplary power transmission system according to another embodiment of the present disclosure.

In some embodiments, as shown in FIG. 5 and FIG. 10, the third motor generator 201 may be connected coaxially with a corresponding wheel, and the fourth motor generator 301 may be connected coaxially with a corresponding wheel. In some embodiments, both the third motor generator 201 and the fourth motor generator 301 may be wheel-side motors, thus shortening the transmission passage, reducing the power transmission loss and enhancing the transmission efficiency.

In some embodiments, as shown in FIG. 5 and FIG. 10, the antiskid synchronizer 503 may be disposed on the first output shaft 202 corresponding to the third motor generator 201, and configured to selectively engage with the second output shaft 302 corresponding to the fourth motor generator 301. With the engagement of the antiskid synchronizer 503, the second pair of wheels 77 may rotate together.

The power transmission system 100 and the condition in which the power transmission system 100 may be used will be described below with reference to FIGS. 1-10.

Embodiment 1

As shown in FIG. 1, the engine 4 is connected with the input terminal 23d of the dual clutch 2d, the first output terminal 21d of the dual clutch 2d is connected with the first input shaft 11, and the second output terminal 22d of the dual clutch 2d is connected with the second input shaft 12. The input terminal 23d may be disengaged from both the first output terminal 21d and the second output terminal 22d, or the input terminal 23d may be engaged with one of the first output terminal 21d and the second output terminal 22d, or the input terminal 23d may be engaged with both the first output terminal 21d and the second output terminal 22d.

The second input shaft 12 may be a hollow shaft, and the first input shaft 11 may be a solid shaft. The second input shaft 12 is coaxially fitted over the first input shaft 11, and a part of the first input shaft 11 extends outside of the second input shaft 12 along an axial direction of the second input shaft 12.

The first-gear shift driving gear 1a, the third-gear shift driving gear 3a and the fifth-gear shift driving gear 5a are disposed on the first input shaft 11 and configured to rotate together with the first input shaft 11. The first-gear shift driving gear 1a is positioned to the right of the fifth-gear shift driving gear 5a, and the third-gear shift driving gear 3a is positioned to the left of the fifth-gear shift driving gear 5a.

The second-gear shift driving gear 2a and the fourth-gear shift driving gear 4a are disposed on the second input shaft 12. The second-gear shift driving gear 2a is positioned to the right of the fourth-gear shift driving gear 4a.

The first output shaft 21 is arranged parallel to the two input shafts, i.e. the first and second input shafts 11, 12. The first-gear shift driven gear 1b, the second-gear shift driven gear 2b, the third-gear shift driven gear 3b and the fourth-gear shift driven gear 4b are fitted over the first output shaft 21. The first-gear shift driven gear 1b is configured to mesh directly with the first-gear shift driving gear 1a, the second-gear shift driving gear 2a is configured to mesh directly with the second-gear shift driven gear 2b, the third-gear shift driving gear 3a is configured to mesh directly with the third-gear shift driven gear 3b, and the fourth-gear shift driving gear 4a is configured to mesh directly with the fourth-gear shift driven gear 4b.

The first-third gear synchronizer 13c and the second-fourth gear synchronizer 24c are disposed on the first output shaft 21. The first-third gear synchronizer 13c is positioned between the first-gear shift driven gear 1b and the third-gear shift driven gear 3b and configured to selectively synchronize the first output shaft 21 with the first-gear shift driven gear 1b or the third-gear shift driven gear 3b. The second-fourth gear synchronizer 24c is positioned between the second-gear shift driven gear 2b and the fourth-gear shift driven gear 4b and configured to selectively synchronize the first output shaft 21 with the second-gear shift driven gear 2b or the fourth-gear shift driven gear 4b.

The second output shaft 22 is arranged parallel to the two input shafts, i.e. the first and second input shafts 11, 12. The fifth-gear shift driven gear 5b is fitted over the second output shaft 22. The fifth-gear shift driven gear 5b may mesh with the fifth-gear shift driving gear 5a directly. The fifth gear synchronizer 5c is disposed on the second output shaft 22 and configured to synchronize the second output gear with the fifth-gear shift driven gear 5b.

The first output shaft gear 211 is fixed on the first output shaft 21 and configured to mesh with the shift driven gear 74. The second output shaft gear 221 is fixed on the second output shaft 22 and configured to mesh with the shift driven gear 74.

The motor power shaft 3 is disposed coaxially with the two input shafts such as the first and second input shafts 11, 12 and the two output shafts such as the first and second output shafts 21, 22. The output idler gear 34 is fitted over the motor power shaft 3. The output idler gear 34 meshes with the shift driven gear 74 so as to output power from the motor power shaft 3. The output idler gear synchronizer 34c may be disposed on the right side of the output idler gear 34 and configure to engage with the output idler gear 34.

The first motor power shaft gear 31 is fitted over the motor power shaft 3, and the second motor power shaft gear 32 is fixed on the motor power shaft 3. The motor power shaft synchronizer 33c is positioned to the right of the first motor shaft gear 31 and disposed on the motor power shaft 3. The motor power shaft synchronizer 33c is configured to engage with the first motor shaft gear 31 such that the first motor power shaft gear 31 can rotate together with the motor power shaft 3.

The first motor power shaft gear 31 may drive the second-gear shift driving gear 2a via the transmission idler 71 with the joint gear structure. In other words, the transmission idler gear 71 may mesh with the first motor power shaft gear 31 and the second-gear shift driving gear 2a correspondingly and may fit over the second output shaft 22. The second motor power shaft gear 32 may selectively rotate together with the second output shaft 22. As shown in FIG. 1, the motor power output gear 6 is fitted over the second output gear 22. The motor power output gear synchronizer 6c is disposed on the second output shaft 22 and configured to engage with the motor power output gear 6 such that the motor power output gear 6 may rotate together with the second output shaft 22. The second motor power shaft gear 32 is meshed with the motor power output gear 6. The first motor generator 51 and the motor power shaft 3 are coaxially connected.

A condition in which the power transmission system 100 according to embodiments of the present disclosure may be used will be discussed below in detail with reference to FIG. 1.

Parking-Charging Condition

The input terminal 23d of the dual clutch 2d is engaged with the second output terminal 22d while disengaged from the first output terminal 21d. The motor power shaft synchronizer 33c engages the first motor gear 31, such that power output by the engine 4 may be transmitted to the first motor generator 51 via the input terminal 23d, the second output terminal 22d, the second input shaft 12, the second-gear shift driving gear 2a, the middle idler 73, the first motor gear 31, the motor power shaft synchronizer 33c and the motor power shaft 3 sequentially, thus driving the first motor generator 51 to generate electric power.

In the parking-charging condition, charging the vehicle with a fixed velocity ratio may be achieved, and the power transmission efficiency may be increased. Those with ordinary skill in the art will appreciate that the velocity ratio relates to parameters such as the rotating speed of the engine 4 in the parking state, the type of the first motor generator 51, and maximum rotating speed acceptable by the peripheral parts such as bearings, and so on. In the present disclosure, the velocity ratio may be designed according to the above-mentioned parameters and the power transmission ratio may be flexibly designed, thus making maximum use of the power from the engine 4 and achieving the object of fast charging. In the parking-charging condition, power from the engine 4 may be transmitted via a transmission passage consisting of the first input shaft 11, the fifth-gear gear pair and the generator gear 73 or a transmission passage consisting of the second input shaft 12, the sixth-gear gear pair and the generator gear 73, and therefore the object of charging with an optimal fixed velocity ratio may be achieved. Thus both the charging efficiency and the fuel economy of the engine are improved.

Pure Electric Condition
First Electric Condition

The output idler gear synchronizer 34c may engage with the output idler gear 34, such that power generated by the first motor generator 51 may be transmitted to output idler gear 34 via the motor power shaft 3 so as to be output. This transmission passage has less transmission components and higher efficiency.

Second Electric Condition

The motor power shaft synchronizer 33c may engage with the first motor power shaft gear 31. Power generated by the first motor generator 51 may be transmitted to the second input shaft 12 via the first motor power shaft gear 31. The second-fourth gear synchronizer 24c may selectively engage with the second-gear shift driven gear 2b and the fourth-gear shift driven gear 4b, such that the power may be transmitted to second-gear gear pair or the fourth-gear gear pair so as to be output.

Third Electric Condition

The motor power output gear synchronizer 6c may engage with the motor power output gear 6. Power generated by the first motor generator 51 may be transmitted to the second output shaft 22 via the second motor power shaft gear 32 and the motor power output gear 6 so as to be output.

In the pure electric condition, power from the first motor generator 51 may be transmitted to wheels of the vehicle via three power transmission passages having different velocity ratios, thus driving the vehicle to run. In cases when the first motor generator 51 is used to start, to accelerate, to climb or to run, different velocity ratios may be selected accordingly to ensure that the first motor generator 51 has the highest operation efficiency.

First First-Gear Hybrid Condition

In the first first-gear hybrid condition, the output idler gear synchronizer 34c may engage with the output idler gear 34. Power generated by the first motor generator 51 may be transmitted to the output idler gear so as to be output. Power generated by the engine 4 may be transmitted to any of the forward gear pairs. Two parts of the power are coupled at the shift driven gear 74 of a main reducer, and then output.

In the hybrid reverse mode, the first motor generator 51 may adjust the speed, such that the shift driven gear 74 may synchronously receive the first power from the engine 4 and the second power from the first motor generator 51, to provide a smooth and harmonious power transmission.

First Second-Gear Hybrid Condition

In the first second-gear hybrid condition, the motor power shaft synchronizer 33c is engaged with the first motor power shaft gear 31, such that power generated by the first motor generator 51 may be transmitted to the second input shaft 12. Power generated by the engine 4 may be transmitted to the second input shaft 12. The first power and the second power are coupled at the second input shaft 12, and then transmitted to the second-gear gear pair and the fourth-gear gear pair, so as to be output. The first motor generator 51 may adjust the speed, such that the second input shaft 12 may synchronously receive the first power from the engine 4 and the second power from the first motor generator 51, to provide a smooth and harmonious power transmission. In some embodiments, the power generated by the engine 4 may be transmitted to the first input shaft 11, and then transmitted to the first-gear gear pair, the third-gear gear pair or the fifth-gear gear pair. For example, the power generated by the engine 4 may be transmitted to the first-gear gear pair, and the power generated by the first motor generator 51 may be transmitted to second-gear gear pair. The first motor generator 51 may adjust the speed, such that the first output shaft 21 may synchronously receive the first power from the engine 4 and the second power from the first motor generator 51, to provide a smooth and harmonious power transmission. In some embodiments, the power generated by the engine 4 may be transmitted to the fifth-gear gear pair. The first motor generator 51 may adjust the speed, such that the shift driven gear 74 may synchronously receive the first power from the engine 4 and the second power from the first motor generator 51.

First Third-Gear Hybrid Condition

In the first third-gear hybrid condition, the motor power output gear synchronizer 6c may engage with the motor power output gear 6. Power generated by the engine 4 may be output via the first-gear gear pair, the second-gear gear pair, the third-gear gear pair, or the fourth-gear gear pair. The power generated by the engine 4 and the power generated by the first motor generator 51 may be coupled at the shift driven gear 74, and then the power may be output via the differential 75. The first motor generator 51 may adjust the speed, such that the shift driven gear 74 may synchronously receive the first power from the engine 4 and the second power from the first motor generator 51, to provide a smooth and harmonious power transmission. In some embodiments, the power generated by the engine 4 may be output via the fifth-gear gear pair. The first motor generator 51 may adjust the speed, such that the second output shaft 22 may synchronously receive the first power from the engine 4 and the second power from the first motor generator 51, to provide a smooth and harmonious power transmission.

In the present disclosure, a person skilled in the art may flexibly select any of the above-mentioned hybrid conditions and power transmission passages thereof according to practical requirements. With these hybrid conditions, more driving fun may be provided to the users. In addition, the vehicle may be used in different road conditions, thus enhancing both the power and the fuel economy of the vehicle.

First First-Gear Driving-Charging Condition

In the first first-gear driving-charging condition, the output idler gear synchronizer 34c may engage with the output idler gear 34. Power generated by the engine 4 may be output via any of the forward gear pairs. Power generated by the corresponding wheels may be transmitted to the motor power shaft 3, thus driving the first motor generator 51 to generate electric power.

First Second-Gear Driving-Charging Condition

In the first second-gear driving-charging condition, the motor power output gear synchronizer 6c may engage with the motor power output gear 6. Power generated by the engine 4 may be output via the first-gear to fourth-gear gear pair. Power generated by the wheels may be transmitted to the motor power shaft 3 via the second output shaft 22, the motor power output gear 6, and the second motor power shaft gear 32, thus driving the first motor generator 51 to generate electric power. The power generated by the engine 4 may be output via the fifth-gear gear pair. One part of the power may be transmitted to the second output shaft 22, and the other part of the power may be transmitted to the motor power shaft 3 via the motor power output gear 6 and the second motor power shaft gear 32, thus driving the first motor generator 51 to generate electric power.

First Third-Gear Driving-Charging Condition

In the first first-gear and second-gear driving-charging condition, one of the two gear parts of the dual clutch 2d is engaged when performing power transmission. For example, the input terminal 23d is engaged with the first output terminal 21d or engaged with the second output terminal 22d. In the first third-gear driving-charging condition, the input terminal 23d is engaged with both the first output terminal 21d and the second output terminal 22d, thus achieving a new driving-charging condition.

In the first third-gear driving-charging condition, the motor power shaft synchronizer 33c may engage with the first motor power shaft gear 31. A part of power generated by the engine 4 may be transmitted to the second input shaft 12, and then the power may be transmitted to the first motor generator 51 via the second-gear shift driving gear 2a, the transmission idler gear 71, the first motor power shaft gear 31 and the motor power shaft 3, thus driving the first motor generator 51 to generate electric power. At the same time, the other part of the power generated by the engine 4 may be transmitted to the first input shaft 11, so as to be output via the first-gear gear pair, the third-gear gear pair, or the fifth-gear gear pair.

In the present disclosure, a person skilled in the art may flexibly select any of the above-mentioned hybrid conditions and power transmission passages thereof according to practical requirements. With these hybrid conditions, more driving fun may be provided to the users. In addition, the vehicle may be used in different road conditions, thus enhancing both the power and the fuel economy of the vehicle.

In the driving-charging conditions, a part of power from the engine 4 may be transmitted via a passage consisting of the second input shaft 12, the transmission idler gear 71, the first motor power shaft gear 31 and the motor power shaft 3. Therefore the object of charging with an optimal fixed velocity ratio may be achieved, and both the charging efficiency and the fuel economy of the engine 4 are improved.

Mechanical Reverse Condition

In the mechanical reverse condition, the motor power shaft synchronizer 33c may engage with the first motor power shaft gear 31, and the output idler gear synchronizer 34c may engage with the output idler gear 34. Power generated by the engine 4 may be transmitted to the output idler gear 34 via the second input shaft 12, the second-gear shift driving gear 2a, the transmission idler gear 71, the first motor power shaft gear 31, and the motor power shaft 3, so as to be output.

Electric Reverse Condition

In the electric reverse condition, the output idler gear synchronizer 34c may engage with the output idler gear 34. Power generated by the first motor generator 51 may be transmitted to the output idler gear 34 via the motor power shaft 3. In some embodiments, the motor power output gear synchronizer 6c may engage with the motor power output gear 6. Power generated by the first motor generator 51 may be transmitted to the second output shaft 22 via the second motor power shaft gear 32 and the motor power output gear 6, so as to be output.

Hybrid (Electric-Mechanical) Reverse Condition

In the hybrid reverse condition, the motor power shaft synchronizer 33c may engage with the first motor power shaft gear 31, and the output idler gear synchronizer 34c may engage with the output idler gear 34. Power generated by the engine 4 and power generated by the first motor generator 51 are both transmitted to the output idler gear 34. Two parts of the power are coupled at the output idler gear 34 and then output. The first motor generator 51 may adjust the speed, such that the output idler gear 34 may synchronously receive the first power from the engine 4 and the second power from the first motor generator 51, to provide a smooth and harmonious power transmission.

In the parking-charging condition and the running-charging condition, the power generated by the engine 4 may be transmitted to the first motor generator 51 via the first motor power shaft gear 31. The first motor generator 51 may always rotate along the original rotational direction (the predetermined rotational direction such as the clockwise direction). When the first generator 51 is regarded as the power producer, (the power is output via the first motor power shift gear 31 or the second motor power shift gear 32) such as in the pure electric conditions and the hybrid conditions, the first motor generator 51 may always rotate along the original rotational direction (the predetermined rotational direction such as the clockwise direction). In the reverse conditions, when the power generated by the first motor generator 51 may be output via a transmission passage consisting of the motor power shaft 3 and the output idler gear 34, the first motor generator 51 may always rotate along the original rotational direction (the predetermined rotational direction such as the clockwise direction).

With the power transmission system 100 according to embodiments of the present disclosure, the first motor generator 51 may rotate along the predetermined rotational direction in all the above-mentioned conditions. In other words, the first motor generator 51 may always rotate along the predetermined rotational direction when functioning as a motor or as a generator. Even during the power transmission system 100 switching from one condition to the reverse condition, the rotational direction of the first motor generator 51 needs not to be changed. Therefore, the first motor generator 51 may always rotate along the predetermined rotational direction in all related conditions, such that problems of shock and interruption due to direction change of the motor may be avoided, and the life of the power transmission system 100 may be prolonged.

Embodiments 2-5

As shown in FIGS. 2-5, the power transmission system 100 in the present embodiment is substantially the same as that in Embodiment 1, with the following exceptions that a rear-wheel driving mechanism, a third motor generator 201, a fourth motor generator 301, and an antiskid synchronizer 503 are added respectively.

Embodiment 6

As shown in FIG. 6, the power transmission system 100 in the present embodiment is substantially the same as that in Embodiment 1, with the following exceptions that a second motor generator 52 is added and the second motor generator 52 may be disposed on the both sides of the differential 75. Such that power performance of the power transmission system 100 can be improved.

Embodiments 7-10

As shown in FIGS. 7-10, the power transmission system 100 in the present embodiment is substantially the same as that in Embodiment 6, with the following exceptions that a rear-wheel driving mechanism, a third motor generator 201, a fourth motor generator 301, and an antiskid synchronizer 503 are added respectively.

Embodiment 11

As shown in FIG. 11, the power transmission system 100 in the present embodiment is substantially the same as that in Embodiment 1, with the following exceptions that the engine 4, the dual clutch 2d, the first motor generator 51, and the differential may be avoided.

Embodiments of the present disclosure further provide a vehicle including the above-identified power transmission system 100. Other configuration such as the driving system, the turning system and the braking system may be well known to those skilled in the art, thus details thereof are omitted herein.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above-mentioned embodiments cannot be construed to limit the present disclosure, and changes, alternatives, and modifications can be made in the embodiments without departing from spirit, principles and scope of the present disclosure.

What is claimed is:

1. A transmission unit for a vehicle, comprising:
a plurality of input shafts, each of the input shafts having a shift driving gear thereon;
a plurality of output shafts, wherein each of the output shafts has a shift driven gear configured to mesh with a corresponding shift driving gear;

a motor power output gear disposed on one of the output shafts;

a motor power shaft;

a first motor power shaft gear disposed on the motor power shaft and configured to rotate together with one of the shift driving gears;

a second motor power shaft gear disposed on the motor power shaft and configured to rotate together with the motor power output gear;

an output idler gear fitted over the motor power shaft; and an output idler gear synchronizer disposed on the motor power shaft and configured to engage with the output idler gear.

2. The transmission unit according to claim 1, wherein the first motor power shaft gear is configured to perform power transmission with one of the shift driving gears via a transmission idler gear.

3. The transmission unit according to claim 2, wherein the transmission idler gear is fitted over one of the output shafts.

4. The transmission unit according to claim 2, wherein the transmission idler gear is a joint gear structure; wherein one part of the joint gear is meshed with one of the shift driving gears; and wherein the other part of the joint gear is meshed with the first motor power shaft gear.

5. The transmission unit according to claim 2, wherein the first motor power shaft gear is fitted over the motor power shaft; and wherein a motor power shaft synchronizer is disposed on the motor power shaft and configured to engage with the first motor power shaft gear.

6. The transmission unit according to claim 5, wherein the second motor power shaft gear is fixed on the motor power shaft; wherein the motor power output gear is fitted over one of the output shafts; and wherein a motor power output gear synchronizer is disposed on the one of the output shafts and configured to engage with the motor power output gear.

7. The transmission unit according to claim 6, wherein the motor power output gear synchronizer and the motor power shaft synchronizer are configured to share a shift fork mechanism; wherein the motor power shaft synchronizer is in a disengaged state when the motor power output gear synchronizer engages with the motor power output gear; and wherein the motor power output gear synchronizer is in a disengaged state when the motor power shaft synchronizer engages with the first motor power shaft gear.

8. The transmission unit according to claim 6, wherein the plurality of input shafts comprise a first input shaft and a second input shaft coaxially fitted over the first input shaft; and wherein the plurality of the output shafts comprise a first output shaft and a second output shaft parallel to respectively the first input shaft and the second input shaft.

9. The transmission unit according to claim 8, wherein the shift driving gears on the plurality of input shafts comprise: a first-gear driving gear disposed on the first input shaft, a second-gear driving gear disposed on the second input shaft, a third-gear driving gear disposed on the first input shaft, a fourth-gear driving gear disposed on the second input shaft, and a fifth-gear driving gear disposed on the first input shaft; wherein the shift driven gears on the plurality of output shafts comprise: a first-gear driven gear, a second-gear driven gear, a third-gear driven gear, and a fourth-gear driven gear disposed on the first output shaft, and a fifth-gear driven gear disposed on the second output shaft; wherein a first-third gear synchronizer is disposed between the first-gear driven gear and the third-gear driven gear, a second-fourth gear synchronizer is disposed between the second-gear driven gear and the fourth-gear driven gear, and a fifth-gear synchronizer is disposed at a side of the fifth-gear driven gear.

10. The transmission unit according to claim 9, wherein the first motor power shaft gear is rotated together with the second-gear driving gear; and wherein the motor power output gear is fitted over the second output shaft.

11. The transmission unit according to claim 8, wherein a first output shaft gear is fixed on the first output shaft; wherein a second output shaft gear is fixed on the second output shaft; and wherein the first output shaft gear, the second output shaft gear and the output idler gear are all meshed with a shift driven gear of a main reducer.

12. A power transmission system comprising:

the transmission unit according to claim 8;

a first motor generator configured to rotate together with the motor power shaft of the transmission unit;

an engine; and a dual clutch comprising: an input terminal connected with the engine, a first output terminal coupled with the first input shaft, and a second output terminal coupled with the second input shaft.

13. The power transmission system according to claim 12, wherein the engine is configured to engage the input terminal of dual clutch with the first output terminal and the second output terminal of the dual clutch simultaneously to transmit a first part of power to one or more wheels via one of the output shafts, and to transmit a second part of power to the first motor generator via the first motor power shaft gear to cause the first motor generator to generate electric power.

14. The power transmission system according to claim 12, wherein the engine is configured to transmit power to the first motor power shaft gear, and to transmit the power to the first motor generator to drive the first motor generator to generate electric power, and when the vehicle is in a parking state.

15. The power transmission system according to claim 12, wherein the vehicle comprises a mechanical reverse mode, an electric reverse mode and a hybrid reverse mode; wherein the engine is configured to generate a first power and the first motor generator is configured to generate a second power; and wherein:

when the vehicle is in the mechanical reverse mode, the engine is configured to transmit the first power to the first motor power shaft gear, and to transmit the first power to the output idler gear via a synchronization of the motor power shaft synchronizer and a synchronization of the output idler gear synchronizer;

when the vehicle is in an electric reverse mode, the first motor generator is configured to transmit the second power to the output idler gear;

when the vehicle is in an electric reverse mode, the first motor generator is configured to transmit the second power to the output shaft with the motor power output gear via a synchronization of the motor power output gear synchronizer; and when the vehicle is in a hybrid reverse mode, the engine is configured to transmit the first power to the first motor power shaft gear, and to transmit the first power to the output idler gear via a synchronization of the motor power shaft synchronizer and a synchronization of the output idler gear synchronizer, and the first motor generator is configured to transmit the second power to the output idler gear via a synchronization of the output idler gear synchronizer.

16. The power transmission system according to claim 12, wherein the first motor generator is configured to rotate always in a predetermined direction, when the first motor generator works as a motor or a generator.

17. The power transmission system according to claim 12, further comprising a second motor generator, wherein the second motor generator is configured to perform power transmission with a driven gear of a main reducer of the vehicle, or is connected with the first output shaft, or is connected with the first input shaft, or the driven gear of the main reducer is disposed on a differential of the vehicle with two second motor generators being provided and disposed on two sides of the differential respectively.

18. The power transmission system according to claim 12, wherein the engine and/or the first motor generator is configured to drive a first pair of wheels of the vehicle, and the power transmission system further comprises:
 a third motor generator configured to rotate together with one of a second pair of wheels of the vehicle;
 a fourth motor generator configured to rotate together with the other one of the second pair of wheels of the vehicle, wherein the first pair of wheels are one pair of a pair of front wheels and a pair of rear wheels of the vehicle, and the second pair of wheels are the other pair of the pair of front wheels and the pair of rear wheels; and
 an antiskid synchronizer configured to selectively synchronize the second pair of wheels.

19. The power transmission system according to claim 18, further comprising:
 a first gear disposed on a first power output shaft corresponding to the third motor generator;
 a second gear disposed on a first drive shaft connected with a wheel corresponding to the third motor generator;
 a third gear configured to mesh with the first gear;
 a fourth gear coaxially arranged with the third gear and configured to mesh with the second gear and to rotate together with the third gear;
 a fifth gear disposed on a second power output shaft corresponding to the fourth motor generator;
 a sixth gear disposed on a second drive shaft connected with a wheel corresponding to the fifth motor generator;
 a seventh gear configured to mesh with the fifth gear; and
 an eighth gear coaxially arranged with the seventh gear and configured to mesh with the sixth gear and to rotate together with the eighth gear;
 wherein the antiskid synchronizer is disposed on the first drive shaft and configured to selectively engage with the sixth gear; or the anti skid synchronizer is disposed on the first power output shaft corresponding to the third motor generator and is configured to selectively engage with the fifth gear; or the third gear and the fourth gear are fixed on a first gear shaft, the seventh gear and the eighth gear are fixed on a second gear shaft, and the antiskid synchronizer is disposed on the first gear shaft and configured to selectively engage with the seventh gear.

20. The power transmission system according to claim 18, wherein the first power output shaft is coaxially coupled with a wheel corresponding to the first output shaft, the second power output shaft is coaxially connected with a wheel corresponding to the second output shaft, and the antiskid synchronizer is disposed on the first power output shaft and configured to engage with the second power output shaft.

21. A power transmission system, comprising:
 the transmission unit according to claim 1; and
 a first motor generator configured to rotate together with the motor power shaft of the transmission unit.

22. The vehicle comprising the power transmission system according to claim 21.

\* \* \* \* \*